(12) United States Patent
Ia O' et al.

(10) Patent No.: US 8,691,464 B2
(45) Date of Patent: Apr. 8, 2014

(54) THREE DIMENSIONAL SINGLE-CHAMBER FUEL CELLS

(75) Inventors: Gerardo Jose Ia O', Somerville, MA (US); Serkan Koc, Melrose, MA (US); Ethan J. Crumlin, Cambridge, MA (US); Yang Shao-Horn, Cambridge, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 911 days.

(21) Appl. No.: 12/601,388

(22) PCT Filed: May 23, 2008

(86) PCT No.: PCT/US2008/006641
§ 371 (c)(1),
(2), (4) Date: Jun. 7, 2010

(87) PCT Pub. No.: WO2008/153763
PCT Pub. Date: Dec. 18, 2008

(65) Prior Publication Data
US 2010/0248064 A1 Sep. 30, 2010

Related U.S. Application Data

(60) Provisional application No. 60/931,803, filed on May 25, 2007.

(51) Int. Cl.
*H01M 8/24* (2006.01)
(52) U.S. Cl.
USPC ............ 429/452; 429/454; 429/467; 429/471
(58) Field of Classification Search
USPC .......................... 429/452–456, 467–468, 471
See application file for complete search history.

(56) References Cited

U.S. PATENT DOCUMENTS

| 4,248,941 A | 2/1981 | Louis et al. |
| 4,648,955 A | 3/1987 | Maget |

(Continued)

FOREIGN PATENT DOCUMENTS

| EP | 1294036 | 3/2003 |
| EP | 1416559 A2 | 5/2004 |

(Continued)

OTHER PUBLICATIONS

International Preliminary Report on Patentability from corresponding International Application No. PCT/US2008/006641, issued Dec. 1, 2009.

(Continued)

*Primary Examiner* — Basia Ridley
*Assistant Examiner* — James Erwin
(74) *Attorney, Agent, or Firm* — Wolf, Greenfield & Sacks, P.C.

(57) ABSTRACT

The present invention relates to single chamber fuel cells and systems and methods associated with the same. Architectures and materials that allow for high performance, enhanced fuel utilization, mechanical robustness, and mechanical flexibility are described. In some embodiments, multiple fuel cell units are arranged in a single chamber and may be, in some cases, connected to each other (e.g., connected in series, connected in parallel, etc.). Each fuel cell unit can be defined as one or more anode(s), one or more cathode(s), and an electrolyte able to maintain electrical separation between the anode(s) and cathode(s). The multiple fuel cell units are arranged in stacks in some cases. In one set of embodiments, the stacks of fuel cell units can be shaped and/or arranged to enhance the mixing of fuel and oxidant, thus improving distribution of reactants in the reaction zone. For example, the stacks of fuel cells may be arranged as fins within the fuel cell chamber. In addition, the stacks of fuel cells may be porous in some instances. In addition, the stacks of fuel cell units may be arranged to enhance other fluid flow parameters (e.g., residence time, reactant distribution, etc.). In some cases, the enhanced fluid flow may lead to increased fuel utilization and system efficiency.

39 Claims, 11 Drawing Sheets

(56) References Cited

U.S. PATENT DOCUMENTS

| | | |
|---|---|---|
| 5,162,166 A | 11/1992 | Ellgen |
| RE34,248 E | 5/1993 | Dyer |
| 5,395,704 A | 3/1995 | Barnett et al. |
| 5,753,385 A | 5/1998 | Jankowski et al. |
| 5,905,275 A | 5/1999 | Nunoue et al. |
| 6,007,683 A | 12/1999 | Jankowski et al. |
| 6,239,033 B1 | 5/2001 | Kawai |
| 6,312,846 B1 | 11/2001 | Marsh |
| 6,541,149 B1 | 4/2003 | Maynard et al. |
| 6,645,656 B1 | 11/2003 | Chen et al. |
| 6,649,287 B2 | 11/2003 | Weeks, Jr. et al. |
| 6,893,769 B2 | 5/2005 | Herman et al. |
| 6,936,366 B2 | 8/2005 | Kearl et al. |
| 7,067,215 B2 | 6/2006 | Lazaroff et al. |
| 7,291,417 B2 | 11/2007 | Herman et al. |
| 7,871,734 B2 | 1/2011 | Hertz et al. |
| 2003/0003347 A1 | 1/2003 | D' Arrigo et al. |
| 2003/0022051 A1 | 1/2003 | Haluzak |
| 2003/0039874 A1 | 2/2003 | Jankowski et al. |
| 2003/0054222 A1 | 3/2003 | Horiuchi et al. |
| 2003/0165727 A1 | 9/2003 | Priestnall et al. |
| 2003/0186104 A1* | 10/2003 | Horiuchi et al. ............. 429/34 |
| 2003/0190505 A1 | 10/2003 | Kearl et al. |
| 2004/0018406 A1 | 1/2004 | Herman et al. |
| 2004/0076868 A1 | 4/2004 | Mardilovich et al. |
| 2004/0086754 A1 | 5/2004 | Lazaroff et al. |
| 2004/0166386 A1 | 8/2004 | Herman et al. |
| 2004/0197628 A1 | 10/2004 | Yoshikata et al. |
| 2005/0026006 A1 | 2/2005 | Haile et al. |
| 2005/0026030 A1* | 2/2005 | Mardilovich et al. ........... 429/44 |
| 2005/0123817 A1 | 6/2005 | Hahn et al. |
| 2007/0141445 A1 | 6/2007 | Hertz et al. |

FOREIGN PATENT DOCUMENTS

| | | |
|---|---|---|
| EP | 1703576 | 9/2005 |
| FR | 2 846 797 A1 | 12/2002 |
| JP | 2000243412 A | 9/2000 |
| JP | 2001236970 A | 8/2001 |
| JP | 2002280015 A | 9/2002 |
| JP | 2002313357 A | 10/2002 |
| JP | 2003282089 A | 10/2003 |
| JP | 2005174663 | 6/2005 |
| WO | WO 01/73881 | 10/2001 |
| WO | WO 03/038935 A1 | 5/2003 |
| WO | WO 03/085761 A2 | 10/2003 |

OTHER PUBLICATIONS

International Search Report and Written Opinion from corresponding International Application No. PCT/US2008/006641, mailed Oct. 7, 2008.
Ahn, et al., "Single-Chamber Solid Oxide Fuel Cell with Micropatterned Interdigitated Electrodes" *Electrochemical and Solid State Letters* 9, A228 (2006).
Appleby, "Fuel Cell Technology Status and Future Prospects" *Energy* 21, 521 (1996).
Baertsch, et al., "Fabrication and structural characterization of self-supporting electrolyte membranes for a micro solid-oxide fuel cell" *Journal of Materials Research* 19, 2604 (2004).
Buergler, et al., "Single chamber solid oxide fuel cells with integrated current-collectors" *Solid State Ionics* 176, 1717 (2005).
Carrette, et al., "Fuel Cells—Fundamentals and Applications" *Fuel Cells* 1, 5 (2001).
Choban, "Membraneless laminar flow-based micro fuel cells operating in alkaline, acidic, and acidic/alkaline media" *Electrochimica Acta* 50, 5390 (2005).
Dyer, et al., "A novel thin-film electrochemical device for energy conversion," *Nature* 1990, 343, 547-548.
Fleig, et al., "Electrodes and electrolytes in micro-SOFCs: a discussion of geometrical constraints," *Solid State Ionics*, vol. 174, 261-270 (2004).
George, "Status of tubular SOFC field unit demonstrations" *Journal of Power Sources* 86, 134 (2000).
Haile, et al., "Solid acids as fuel cell electrolytes" *Nature* 410, 910 (2001).
Heinzel, et al., "Fuel cell for low power applications" *Journal of Power Sources* 105, 250 (2002).
Heywood, "Internal combustion engine fundamentals" *McGraw-Hill, New York*, 1988, p. 648-660.
Hibino et al., "A solid oxide fuel cell with a novel geometry that eliminates the need for preparing a thin electrolyte film," *Journal of the Electrochemical Society* 2000, 149 (2), A195-A200.
Hibino et al., "New concept for simplifying SOFC system," *Solid State Ionics* 1996, 91, 69-74.
Hibino, et al., "Improvement of a Single-Chamber Solid-Oxide Fuel Cell and Evaluation of New Cell Designs," *Journal of the Electrochemical Society* 147 (4), 1338-1343 (2000).
Hibino, et al., "A low-operating-temperature solid oxide fuel cell in hydrocarbon-air mixtures" *Science* 288, 2031 (2000).
Hibino, et al., "A novel cell design for simplifying SOFC system" *Solid State Ionics* 81, 1 (1995).
Hibino, et al., "High performance anodes for SOFCs operating in methane-air mixture at reduced temperatures" *Journal of the Electrochemical Society* 149, A133 (2002).
Hibino, et al., "One-chamber solid oxide fuel cell constructed from a YSZ electrolyte with a Ni anode and LSM cathode" *Solid State Ionics* 127, 89 (2000).
Hibino, et al., "Single chamber solid oxide fuel cell constructed from an Yttria-stabilized zirconia electrolyte" *Electrochemical and Solid State Letters* 2, 317 (1999).
Hidrovo, et al., "Two-phase microfluidics for semiconductor circuits and fuel cells" *Heat Transfer Engineering* 27, 53 (2006).
Horiuchi, et al., "Electrochemical Power Generation Directly from Combustion Flame of Gases, Liquids, and Solids," *Journal of the Electrochemical Society* 151(9), A1402-A1405 (2004).
Jankowski, "Micro-fabricated thin-film fuel cells for portable power requirements" *U.S. Department of Energy* (preprint UCRL-JC-147856) (Mar. 21, 2002).
Jayashree, "Air-breathing laminar flow-based microfluidic fuel cell" *J. Am. Chem. Soc.* 127, 16758 (2005).
Lemons, "Fuel cells for transportation" *Journal of Power Sources* 29, 251 (1990).
Lu, et al., "Development and characterization of a silicon-based micro direct methanol fuel cell" *Electrochimica Acta* 49, 821 (2004).
Meeting the Energy Needs of Future Warriors, 2004.
Morse et al., "A novel thin film solid oxide fuel cell for microscale energy conversion," Part of the SPIE Conference on Micromached Devices and Components V, *SPIE* 1999, 3876, 223-226.
Morse et al., "Novel proton exchange membrane thin-film fuel cell for microscale energy conversation," *Journal of Vacuum Science & Technology A* 2000, 18 (4), 2003-2005.
Moslehi, "Micro fuel cells for portable electronics" *Micro* 24, 98 (2006).
Motokawa, et al., "MEMS-based design and fabrication of a new concept micro direct methanol fuel cell (µ-DMFC)" *Electrochemistry Communications* 6, 562 (2004).
Murray, et al., "A direct-methane fuel cell with a ceria-based anode" *Nature* 400, 649 (1999).
Palo, et al., "Chapter 13 Integrated methanol fuel processors for portable fuel cell systems" *Microreactor Technology and Process Intensification* 914, 209 (2005).
Palo, et al., "Development of a soldier-portable fuel cell power system Part I: A bread-board methanol fuel process" *Journal of Power Sources* 108, 28 (2002).
Patil, et al., "Portable fuel cell systems for America's army: technology transition to the field" *Journal of Power Sources* 136, 220 (2004).
Pichonat et al., "Development of porous silicon-based miniature fuel cells" *Journal of Micromechanics and Microengineering* 15, S179 (2005).
Schwickert, et al., "Glass-ceramic materials as sealants for SOFC applications" *Materialwissenschaft Und Werkstofftechnik* 33, 363 (2002).

(56) References Cited

OTHER PUBLICATIONS

Shao et al., "Anode-supported thin-film fuel cells operated in a single chamber configuration 2T-I-12," *Solid State Ionics* 2004, 175, 39-46.
Shao, "High power-density single-chamber fuel cells operated on methane" *Journal of Power Sources* 162, 589 (2006).
Shao, et al., "A thermally self-sustained micro solid-oxide fuel-cell stack with high power density" *Nature* 435, 795 (2005).
Shiratori et al., "A novel high-voltage single-chamber SOFC with series connected cells," *Electrochemical Society Proceedings*, 2001-16, 1012-1021.
Shiratory et al., "Study of high voltage single chamber SOFC with series connected cells I. IV-IP characteristics of two segments cell," *Electrochemistry* 2001, 69(2), 92-97.
Shukla, et al., "The promise of fuel cell-based automobiles" *Bulletin of Materials Science* 26, 207 (2003).
Simner, et al., "Compressive micro seals for SOFC applications" *Journal of Power Sources* 102, 310 (2001).
Suzuki, et al., "Single Chamber Electrolyte Supported SOFC Module," *Electrochemical and Solid State Letters*, 7 (11) A391-A393 (2004).
Tarascon, et al., "Issues and challenges facing rechargeable lithium batteries," *Nature*, 414, 359 (2001).
Tuller et al., "Thin Films: Application to solid oxide fuel cells," 202nd Electrochemical Society Meeting, Salt Lake City, 2002.
Zhan et al., "An octane-fueled solid oxide fuel cell" *Science* 308, 844 (2005).

\* cited by examiner

THREE DIMENSIONAL SINGLE-CHAMBER FUEL CELLS

RELATED APPLICATIONS

This application is a U.S. National Stage application of International Patent Application Serial No. PCT/US2008/006641, filed May 23, 2008, and entitled "Three Dimensional Single-Chamber Fuel Cells," which claims the benefit of U.S. Provisional Patent Application Ser. No. 60/931,803, filed May 25, 2007, entitled "Three Dimension Single Chamber Fuel Cell," by la O', et al., each of which is incorporated herein by reference.

FIELD OF INVENTION

The present invention relates to fuel cells, and more particularly, to single-chamber fuel cells and methods associated with the same.

BACKGROUND

Recent advances in wireless and portable electronic devices such as laptops, cellular phones, camcorders, and radios have fueled interest in the area of micro-power sources with enhanced energy and power densities relative to existing battery technologies. Similarly, military applications requiring portable power for long-duration missions, autonomous vehicles, and remote sensors have focused increased attention to this area. Developments in integrated circuit (IC) hardware have also necessitated on-chip power sources capable of delivering actuation, sensing and controls requiring more compact packaging.

Fuel cells have become one of the leading candidates to fill the need of increasingly power-hungry portable electronic devices. Fuel cells have the potential to provide higher energy densities relative to batteries (especially when using liquid fuels). Fuel cells also offer the prospect of instantaneous refueling and high energy conversion efficiency. Fuel cells also have the inherent characteristic of vibration free and low-noise operation, a key requirement for personal power packs.

Solid oxide fuel cells (SOFCs) are high temperature fuel cells, usually operating at 500° C. or higher. At high temperatures, electrode reaction rates are enhanced, and non-noble metal catalysts such as pervoskite/flourite oxides and Ni metal can be utilized. In addition, SOFCs have been demonstrated to be capable of directly using high energy density hydrocarbons such as methane, propane and butane, thus reducing the need for fuel reformers and easing system integration into the current fuel infrastructure. Operation at high temperatures, however, requires the use of thermally resistant and gas-tight separators, manifolds, and seals leading to significant engineering challenges and increased the overall complexity of this system. Accordingly, the fabrication of suitable devices can be challenging.

Recent advances in SOFCs have shown that by using chemically selective catalysts at the electrodes, the fuel cells can operate with both fuel and oxidant introduced into a single compartment. This design, called the single chamber fuel cell (SCFC), has received increased interest due to its simplified cell construction. However, one challenge associated with micro-SCFCs is that high fuel and oxidant flow rates may be required to obtain high power performance. When high flow rates are employed, fuel utilization is poor, lowering the overall efficiency of the SCFC and rendering them less attractive.

Accordingly, improved systems and methods are needed.

SUMMARY OF THE INVENTION

The present invention relates generally to compositions and methods associated with single-chamber fuel cells. The subject matter of the present invention involves, in some cases, interrelated products, alternative solutions to a particular problem, and/or a plurality of different uses of one or more systems and/or articles.

In one aspect, the invention generally relates to a device. In some embodiments, the device is a fuel cell device comprising a fuel cell chamber comprising at least one inlet and at least one outlet, and at least a first fuel cell unit and a second fuel cell unit. In some cases, the fuel cell units each include an anode, a cathode, and an electrolyte disposed between the anode and the cathode. In some cases, the anode of the first fuel cell unit is in physical contact with the cathode of the second fuel cell unit, and in certain instances, the anode and cathode of each fuel cell units are each at least partially within the chamber.

In one set of embodiments, the invention includes a fuel cell device comprising a fuel cell chamber comprising at least one inlet and at least one outlet, and at least a first fuel cell unit and a second fuel cell unit. In some embodiments, the fuel cell units each comprising an anode, a cathode, and an electrolyte disposed between the anode and the cathode. The anode and cathode of each of the fuel cell units are each at least partially within the chamber, according to certain instances.

In some embodiments, the invention includes a fuel cell device comprising a fuel cell chamber comprising at least one inlet and at least one outlet, and at least a first fuel cell unit and a second fuel cell unit within the chamber. In some cases, the fuel cell units each include an anode, a cathode, and an electrolyte disposed between the anode and the cathode. In some embodiments, the anode of a first fuel cell unit is in electrical contact with the cathode of a second fuel cell unit. In certain instances, the anodes, cathodes, and electrolytes of the first and second fuel cell units in the fuel cell chamber are simultaneously exposed to at least one fuel.

Another aspect of the invention relates to various methods. In one set of embodiments, the invention includes a method of reacting a gas in a fuel cell comprising flowing a pre-mixed stream of gas comprising at least one oxidant species and at least one fuel species into an inlet of a fuel cell chamber, and within the chamber, exposing an anode and a cathode of each of at least two fuel cell units to the stream of gas.

In one set of embodiments, the invention includes a method of reacting a gas in a fuel cell comprises flowing a first stream of gas comprising at least one oxidant species into a first inlet of a fuel cell chamber, flowing a second stream of gas comprising at least one fuel species into a second inlet of a fuel cell chamber, and within the chamber, exposing an anode and a cathode of each of at least two fuel cell units to the stream of gas.

Other aspects, embodiments and features of the invention will become apparent from the following detailed description when considered in conjunction with the accompanying drawings. The accompanying figures are schematic and are not intended to be drawn to scale. For purposes of clarity, not every component is labeled in every figure, nor is every component of each embodiment of the invention shown where illustration is not necessary to allow those of ordinary skill in the art to understand the invention. All patent applications and patents incorporated herein by reference are incorporated by reference in their entirety. In case of conflict, the present specification, including definitions, will control.

BRIEF DESCRIPTION OF THE DRAWINGS

Non-limiting embodiments of the present invention will be described by way of example with reference to the accompanying figures, which are schematic and are not intended to be drawn to scale. In the figures, each identical or nearly identical component illustrated is typically represented by a single numeral. For purposes of clarity, not every component is labeled in every figure, nor is every component of each embodiment of the invention shown where illustration is not necessary to allow those of ordinary skill in the art to understand the invention. In the figures.

DETAILED DESCRIPTION

Figure 1:
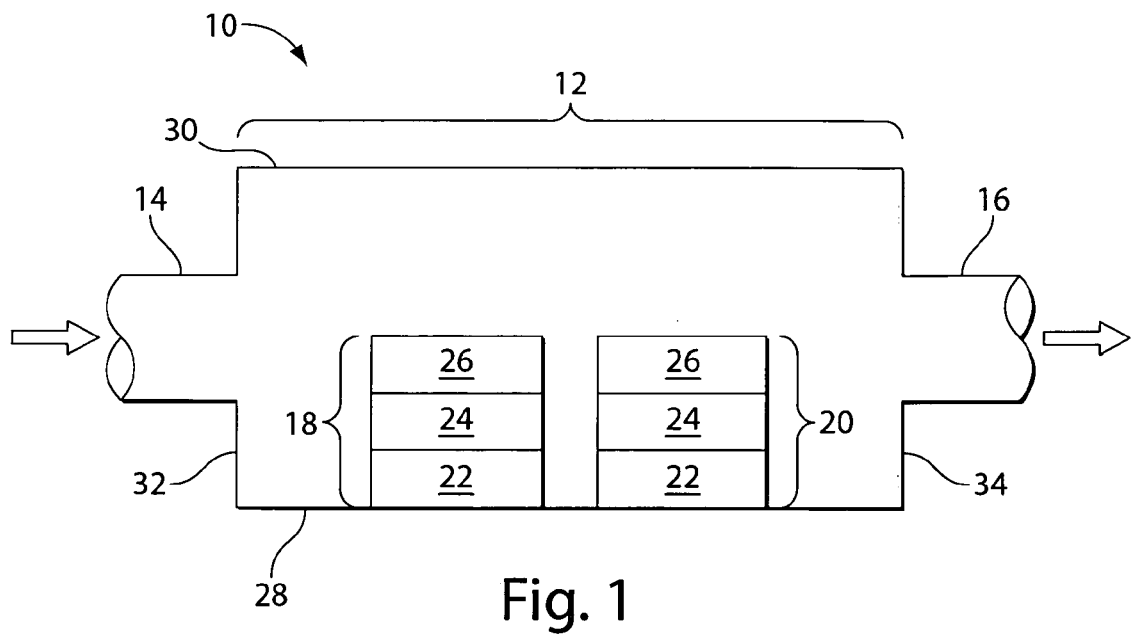
FIG. 1 is a schematic illustration of a device according to one embodiment.

The present invention relates to single chamber fuel cells and systems and methods associated with the same. Architectures and materials that allow for high performance, enhanced fuel utilization, mechanical robustness, and mechanical flexibility are described. In some embodiments, multiple fuel cell units are arranged in a single chamber and may be, in some cases, connected to each other (e.g., connected in series, connected in parallel, etc.). Each fuel cell unit can be defined as one or more anode(s), one or more cathode(s), and an electrolyte able to maintain electrical separation between the anode(s) and cathode(s). The multiple fuel cell units are arranged in stacks in some cases. In one set of embodiments, the stacks of fuel cell units can be shaped and/or arranged to enhance the mixing of fuel and oxidant, thus improving distribution of reactants in the reaction zone. For example, the stacks of fuel cells may be arranged as fins within the fuel cell chamber. In addition, the stacks of fuel cells may be porous in some instances. In addition, the stacks of fuel cell units may be arranged to enhance other fluid flow parameters (e.g., residence time, reactant distribution, etc.). In some cases, the enhanced fluid flow may lead to increased fuel utilization and system efficiency.

During use, a fuel and an oxidant may be passed through the fuel cell chamber. The oxidant may be reduced at the cathode, and the fuel may be oxidized at the anode. The electrolyte serves to electrically separate the anode and cathode, and can also provide a pathway through which ions pass. The oxidation reaction at the anode, which liberates electrons, in combination with the reduction reaction at the cathode, which consumes electrons, produces a useful electrical voltage and current through the load. This direct current voltage may be used to power devices such as cellular phones, laptops, cameras, camcorders, portable media players, etc. In the case of a solid oxide fuel cell, for example, the oxidant is reduced at the cathode to form oxygen ions ($O^{2-}$), which pass through the electrolyte and react with the fuel at the anode to produce water and, in cases where the fuel contains carbon atoms, $CO_2$.

The fuel cell designs disclosed herein may provide several advantages relative to existing fuel cell technology. For example, many of the embodiments described herein may exhibit improved thermal and/or mechanical stability of fuel cell stacks. In addition, some of the disclosed designs may lead to a significant reduction of sealing, manifolding, or gas separation requirements or improved thermal/stress cycling performance of the system. Various schemes for incorporating fuel and/or oxidant gas processing components allowing for greater flexibility in fuel selection will also be described. Due to improved mixing, improved reactant distribution, or increased residence times, some of the designs disclosed herein may lead to increased fuel utilization rates. In addition, many of the disclosed designs are compatible with mechanically flexible materials, allowing for free-form fuel cell designs that may allow for packaging innovations for various portable power applications. In addition, the overall package of the fuel cell with be small and compact, thus reducing overall costs in many instances.

FIG. 1 is a schematic illustration of a device 10 according to one aspect of the invention. The illustrative embodiment comprises a fuel cell chamber 12. The fuel cell chamber may be of any size, for example, having a dimension perpendicular to a longest vector defined between an inlet and an outlet of the chamber of less than about 100 cm, 50 cm, less than 100 mm, less than about 10 mm, less than about 2 mm, less than about 500 microns, less than about 100 microns, less than about 50 microns, less than about 10 microns, less than about 1 micron, less than about 500 nm, or less than about 100 nm, etc. The dimensions of the fuel cell chamber may also be chosen, for example, to allow a certain volumetric or linear flowrate of fluid through the chamber. The device in FIG. 1 also comprises an inlet 14 and an outlet 16. In some embodiments, the fuel cell chamber may comprise a single inlet and/or a single outlet. In other embodiments, the fuel cell chamber may comprise multiple inlets and/or multiple outlets.

The one or more inlet(s) connected to the fuel cell chamber may be fluidically connectable to a source of fuel and/or a source of oxidant. In some cases, the source of fuel and/or oxidant can comprise a stream of gas. Fuels suitable for use in the devices described herein may comprise, for example, hydrocarbons (e.g., methane, propane, methanol, etc.), hydrogen, ammonia, suspended solid particulates (e.g., coal), biogas, and/or any other suitable fuel and/or mixtures thereof. The fuel source can include, for example, a storage tank, the effluent stream of another chemical process, etc. Oxidants suitable for use in the devices described herein may comprise, for example, oxygen and/or any molecule containing an available oxygen atom. The oxidant source may comprise, for example, atmospheric air, a storage tank, the effluent stream of another chemical process, etc.

In some cases, the use of multiple inlets may allow for the tuning of the mixing of fuel and oxidant in the fuel cell chamber, e.g., by independently controlling the flow of fuel or oxidant into the chamber. In addition, strategic selection of the location and number of inlet(s) and/or outlet(s) may, in some cases, allow for more flexibility in controlling such factors as the pressure gradient and reactant distribution in the system. The inlet(s) and outlet(s) may be associated with any one or more walls of the fuel cell chamber (including the floor and ceiling walls). The inlet(s) and outlet(s) may also be of any size, for example, having a largest dimension perpendicular to fluid flow of less than about 100 mm, less than about 10 mm, less than about 2 mm, less than about 500 microns, less than about 100 microns, less than about 50 microns, less than about 10, less than about 1 micron, less than about 500 nm, or less than about 100 nm, etc. In some embodiments, the inlet(s) and outlet(s) can be the same size while in other embodiments, they can be different sizes. In addition, the inlet(s) and outlet(s) can have cross-sectional areas substantially identical to or different from that of the fuel cell chamber. The dimensions of the fuel cell chamber may also be chosen, for example, to allow a certain volumetric or linear flowrate of fluid through the chamber.

Fuel cell chamber 12 in the example of FIG. 1 comprises fuel cell units 18 and 20. As used here, the term "fuel cell unit" refers to a continuous electrolyte in physical contact with at least one anode and at least one cathode. In some embodiments, to be described in more detail later, the fuel cell chamber will comprise more than two fuel cell units in a variety of configurations. Each fuel cell unit, in this example, includes an anode 22, a cathode 26, and an electrolyte 24 disposed between the anode and the cathode. Although the anode, cathode, and electrolytes are illustrated as part of a stack configuration in FIG. 1, the anode and cathode of each fuel cell unit may be configured in any arrangement in which the electrolyte is displaced between the anode and the cathode.

As used herein, terms such as "stack," "fuel cell stack," "stacked," and "stack configuration" are used to refer to structures comprising two or more fuel cell units in physical contact. In one set of embodiments, the fuel cell stack is arranged such that at least one anode is in electrical communication with an anode current collector via an electrical route that passes through at least one cathode. In some cases, the fuel cell stack is arranged such that at least one anode is not in physical contact with an anode current collector. In some cases, the fuel cell stack is arranged such that at least one cathode is in electrical communication with a cathode current collector via an electrical route that passes through at least one anode. In some cases, the fuel cell stack is arranged such that at least one cathode is not in physical contact with the cathode current collector. Current collectors will be described in more detail later. In some embodiments, the two or more fuel cell units may be electrically connected in parallel and/or in series.

In FIG. 1, fuel cell units 18 and 20 are illustrated as posts originating from wall 28. However, the fuel cell units may be arranged in any suitable configuration within the device; these descriptions are for illustrative purposes only. For instance, in some embodiments, the fuel cell units in the fuel cell chamber may include posts in physical contact with a single wall. In some embodiments, the fuel cell units in the fuel cell chamber may comprise posts in physical contact with any wall of the fuel cell chamber. In some cases, the fuel cell units in the fuel cell chamber may span from one wall of the fuel cell chamber to another wall of the fuel cell chamber (e.g., from wall 28 to wall 30, from wall 32 to wall 34, etc.) In some embodiments, the fuel cell units may be in physical contact with two opposing walls of the fuel cell chamber. In some embodiments, fuel cell units may be oriented such that a vector drawn from the center of mass of the cathode to the center of mass of the anode is substantially parallel to the direction of fluid flow in the chamber, substantially orthogonal to the direction of fluid flow in the chamber, or at any other angle relative to fluid flow within the chamber. In some cases, as non-limiting examples, fuel cell units may be oriented such that a vector drawn from the center of mass of the cathode to the center of mass of the anode is oriented at an angle of between about 15 and 75 degrees, between about 30 and 60 degrees, or between about 40 and 50 degrees relative to the direction of fluid flow in the chamber. The fuel cell units may be oriented, in some embodiments, such that a vector drawn from the center of mass of the cathode to the center of mass of the anode is substantially parallel, substantially orthogonal, or at any other angle relative to a wall with which the fuel cell stack is in physical contact. In some cases, fuel cell units may be oriented such that a vector drawn from the center of mass of the cathode to the center of mass of the anode is oriented at an angle of between about 15 and 75 degrees, between about 30 and 60 degrees, or between about 40 and 50 degrees relative to a wall with which the fuel cell stack is in physical contact.

Fuel and oxidant may be introduced into the device using any suitable technique. For instance, during operation of the device, a pre-mixed stream of fuel and oxidant may be urged through a single inlet 14. In some cases, however, pre-mixed streams of fuel and oxidant may be urged through multiple inlets (not shown). In some of these embodiments, the fuel and oxidant feed streams undergo further mixing in the fuel cell chamber, while in other embodiments, the fuel and oxidant feed streams undergo no further mixing. In some instances, substantially pure fuel and oxidant streams may be urged through separate inlets and may be mixed once they enter the fuel cell chamber. Fluid flow schemes utilizing combinations of the above may also be employed in some embodiments.

Figure 13:
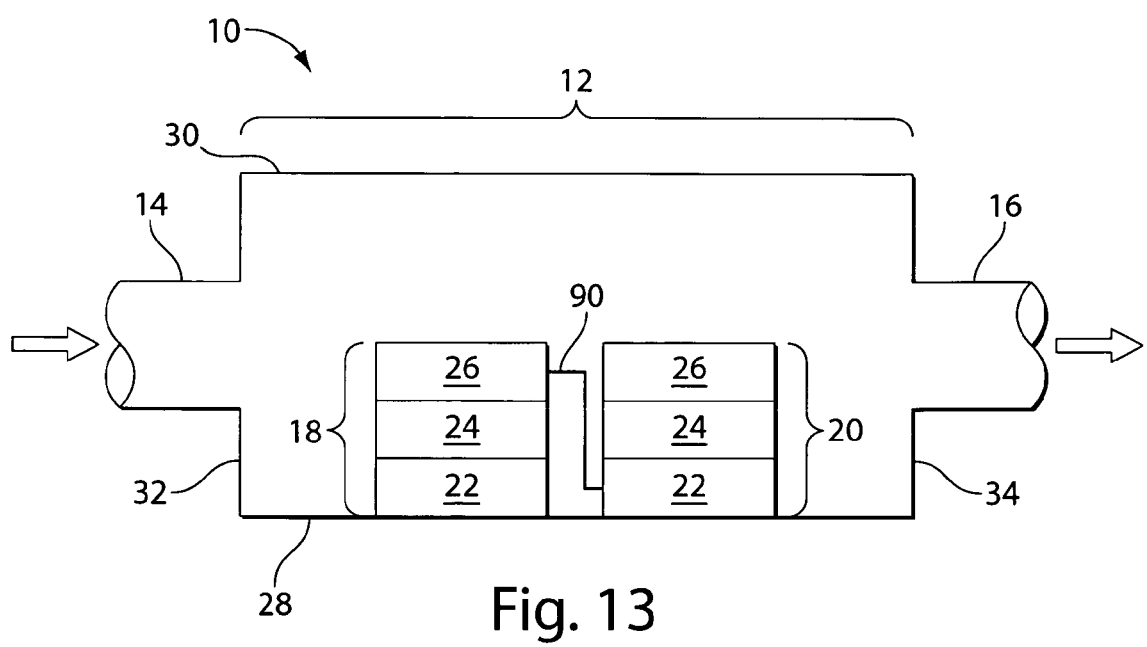
FIG. 13 is a schematic illustration of a device according to one embodiment.

The fuel cell units may, in some embodiments, be completely enclosed by fuel cell chamber 12, as shown in FIG. 1. In some cases, however, any of the anodes, cathodes, and/or electrolytes of any of the fuel cell units may be only partially enclosed by the fuel cell chamber. In some cases, the fuel cell units may be connected in parallel and/or series, and the fuel cell units may be in direct physical contact, or not in direct physical contact (but they may still be in electrical communication). For example, FIG. 13 includes two fuel cell units connected in series via wire 90.

Figure 2:
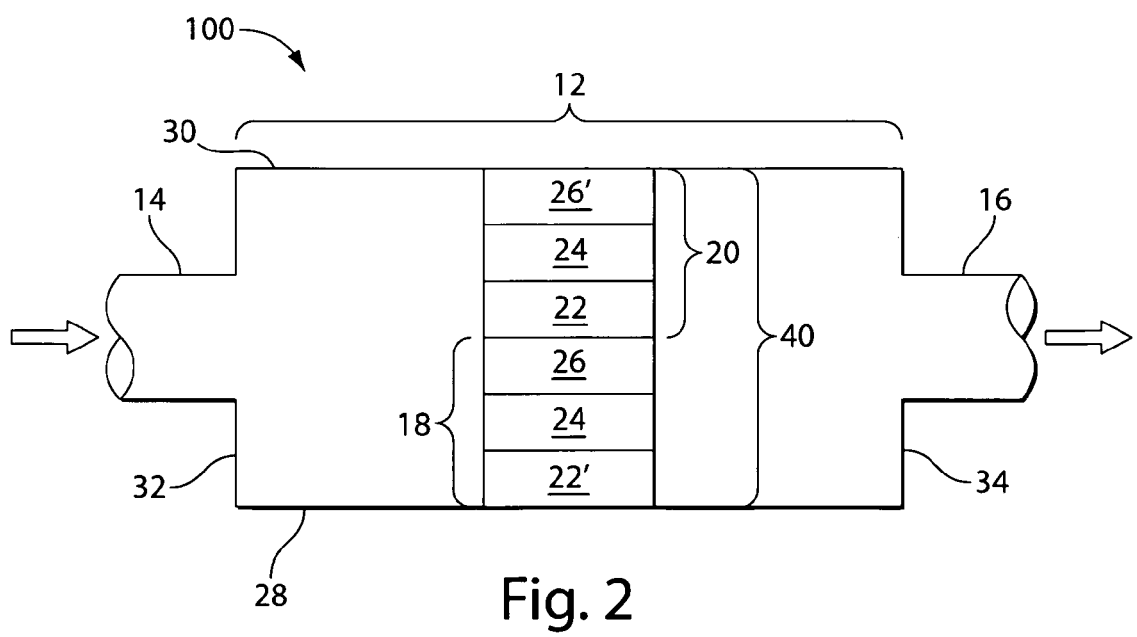
FIG. 2 is a schematic illustration of a device according to another embodiment.

FIG. 2 is a schematic illustration of a device 100 in which multiple fuel cell units are arranged in an alternative configuration, as another example. In FIG. 2, fuel cell units 18 and 20 are disposed one on top of the other to form stack 40. In this set of embodiments, the cathode of fuel cell unit 18 is in physical contact with the anode of fuel cell unit 20, although in other configurations, the anode of fuel cell unit 18 could be in physical contact with the cathode of fuel cell unit 20. While stack 40 comprises two fuel cell units all illustrated in FIG. 2, in some embodiments, stacks may comprise more than 2 fuel cell units. In addition, a fuel cell chamber may comprise more than one fuel cell stack, in some instances.

In FIG. 2, stack 40 is illustrated as spanning from wall 28 to wall 30, although, as mentioned, any suitable configuration of fuel cell units within the device is contemplated. In some embodiments, as examples, the fuel cell stack(s) in the fuel cell chamber may comprise posts in physical contact with any wall of the fuel cell chamber. In addition, in some cases, the fuel cell stack(s) may span from one wall of the fuel cell chamber to any other wall of the fuel cell chamber (e.g., from wall 32 to wall 34, etc.). In some embodiments, the stacks may be in physical contact with two opposing walls of the fuel cell chamber. The fuel cell stacks may be oriented in any manner, including the orientations of the fuel cell units listed above. For example, in some embodiments, fuel cell stacks may be oriented such that a vector drawn from the center of the cathode of the first fuel cell unit comprising the stack to the center of the anode of the last fuel cell unit comprising the stack is substantially parallel to, substantially orthogonal to, or at any other angle relative to fluid flow within the chamber and/or relative to the wall with which the fuel cell stack is in physical contact. In some embodiments, fuel cell stacks may be oriented such that a vector drawn from the center of the cathode of the first fuel cell unit comprising the stack to the center of the anode of the last fuel cell unit comprising the stack is oriented at an angle of between about 15 and 75 degrees, between about 30 and 60 degrees, or between about 40 and 50 degrees relative to the direction of fluid flow in the chamber and/or relative to a wall with which the fuel cell stack is in physical contact.

Figure 3:
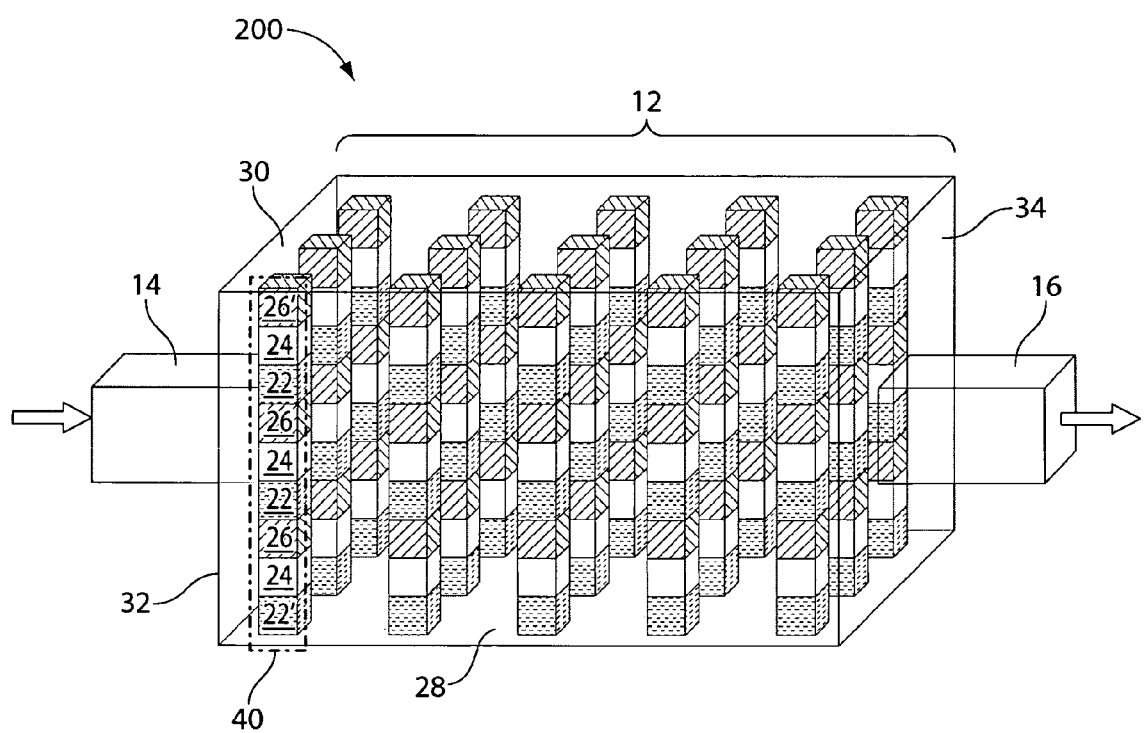
FIG. 3 is a schematic illustration of a device comprising multiple fuel cell stacks according to one embodiment.

FIG. 3 includes a schematic illustration of a device 200 comprising multiple stacks of multiple fuel cell units. Although the schematic in FIG. 3 includes 15 stacks of 3 fuel cell units each, any number of stacks and/or fuel cell units may be included in a device described herein. In this embodiment, the stacks are shaped as columns with roughly 1:1 width to depth aspect ratios, although in other embodiments, any width to depth aspect ratio may be used for any column, as will be described in more detail later. In addition, the embodiment illustrated in FIG. 3 shows stacks organized as an array. In other embodiments, the stacks may be arranged in any pattern, or even randomly, and the stacks may each be the same or different.

Figure 10:
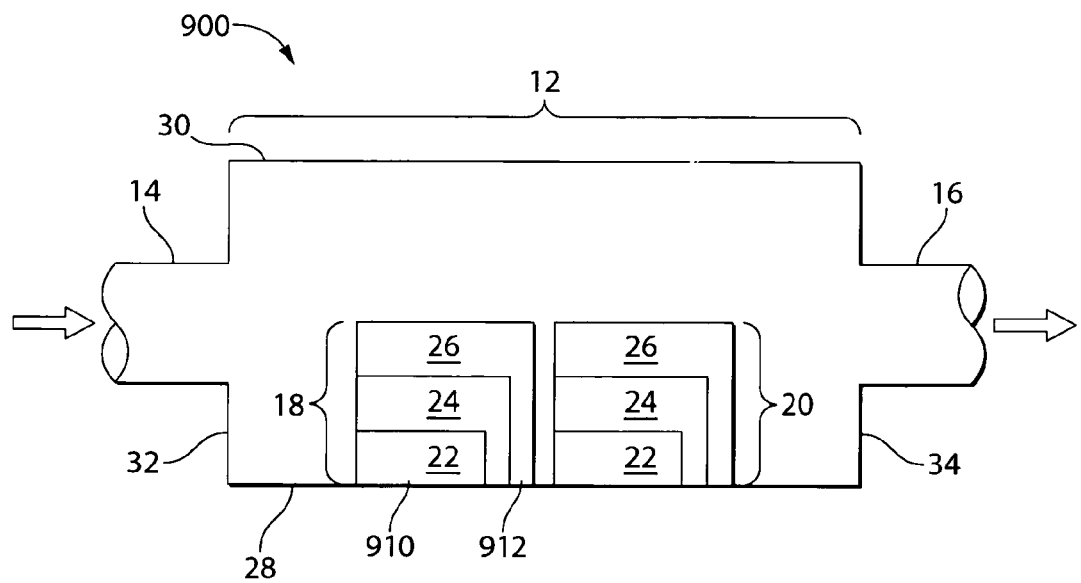
FIG. 10 is a schematic illustration of a device according to one embodiment.

Electrical contact may be made to the fuel cell units and/or stacks in the device via a variety of methods. In one set of embodiments, the walls of the fuel cell chamber may comprise electrically conductive current collector contacts. For example, one or more inner surfaces of the walls of the fuel cell chamber may be electrically conductive in some cases. In some embodiments, one or more inner surfaces of the walls of the fuel cell chamber may include separately formed and/or integrated current collector contacts (e.g., thin films of electrically conductive materials). In some cases, the current collector contacts may be in physical contact with anodes and/or cathodes of the fuel cell units and/or stacks. In certain cases where the fuel cell units are in physical contact with only one wall of the fuel cell chamber, electrical contact may be made with both the anode and the cathode from the same wall. For example, as shown in FIG. 10, anode 22 of fuel cell unit 18 is in contact with wall 28 (or an electrical contact disposed thereon) at point 910 while cathode 26 is in contact with wall 28 (or an electrical contact disposed thereon) at point 912. In this set of embodiments, the anode and cathode are electrically separated by an electrical insulator (although they need not be). In the example of FIG. 10, the electrical insulator here includes an extension of electrolyte 24. In other cases, however, the electrical insulator may comprise another electrically insulating material (e.g., glass, diamond, rubber, polymer, etc.). In some embodiments, rather than extending the electrode, electrical contact may be made via other methods including, but not limited to, wire bonding, deposition of an electrically conducting non-electrode material over an electrical insulator, etc. Similar methods may be used in cases where one or more fuel cell stacks are in physical contact with only one wall of the fuel cell chamber.

Figure 11:
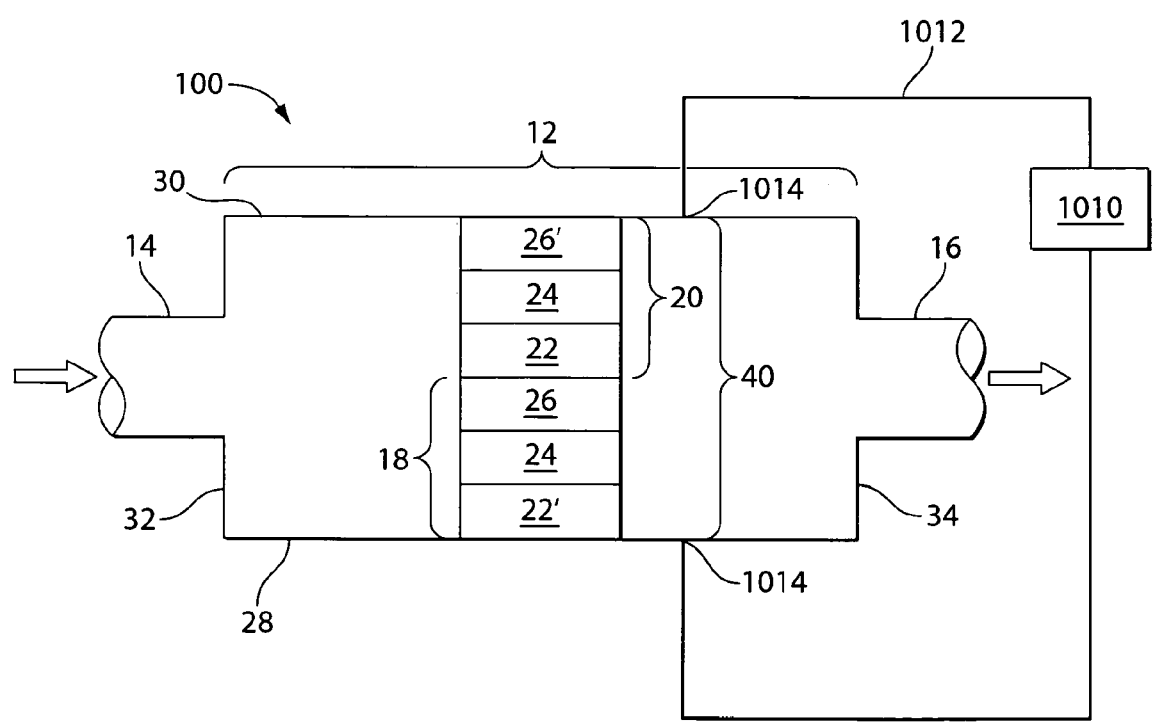
FIG. 11 is a schematic illustration showing a device connected to an external load according to another embodiment.

In some cases, the device includes electrically conductive current collector contacts disposed on walls 28 and 30 and in physical contact with the outermost electrodes 22' and 26' of each stack. For example, device 100 (illustrated in FIG. 2) may include a contact (not shown) disposed on wall 30 of the fuel cell chamber and in physical contact with cathode 26' at the upper end of stack 40. In addition, device 100 may include a second contact disposed on wall 28 and in physical contact with anode 22' at the lower end of stack 40. Another embodiment of this configuration is shown in FIG. 11. In FIG. 11, device 100 is used to power external load 1010. External load 1010 is connected to walls 28 and 30 via wires 1012. In some embodiments, walls 28 and 30 may be electrically conductive. In some cases, walls 28 and 30 may include electrically conductive contact pads at the points of contact 1014 between wires 1012 and walls 28 and 30.

In cases where multiple stacks are present in the fuel cell chamber, one or more current collector contacts may be present on each wall in physical contact with a fuel cell stack. For example, referring to FIG. 3, wall 28 may include one or more current collector contacts. Some or all of the current collector contacts may be in physical contact with one or more electrodes 22' and 26' at the terminal ends of stacks. In addition, wall 30 may also include one or more current collector contacts, and some or all of the current collector contacts may be in physical contact with one or more electrodes 22' and 26' at terminal ends of stacks.

Figure 4:
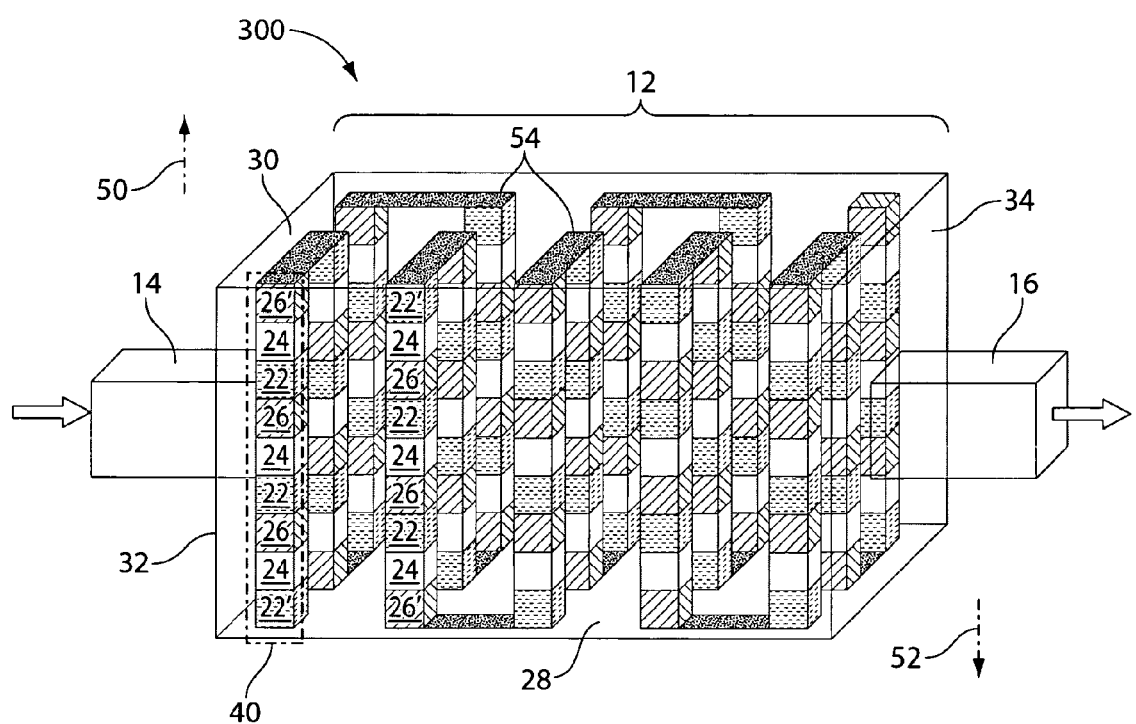
FIG. 4 is a schematic illustration of a device comprising an alternative arrangement of fuel cell stacks according to one embodiment.

In the set of embodiments illustrated in FIG. 3, stacks 40 are uniformly oriented such that the anode 22' terminal ends are all oriented in the same direction, and the cathode 26' terminal ends are all oriented in another direction. As illustrated in FIG. 4, however, other sets of embodiments may comprise stacks that are arranged such that their anode 22' terminal ends (and/or cathode 26' terminal ends) are oriented in different directions. In FIG. 4, the stacks are arranged such that alternating stacks are oriented with their anode terminal ends point in the direction of arrow 50, while the other stacks are oriented such that their anode terminal ends point in the direction of arrow 52. Varying the orientation of the stacks can allow for, in some embodiments, a wide assortment of electrical connectivity schemes. For example, in FIG. 4, device 300 comprises stacks connected in series via current collector contacts 54. In some embodiments, multiple sets of stacks may be connected in series, and the sets may be subsequently connected in parallel. In certain cases, multiple sets of stacks may be connected in parallel, and the sets may be subsequently connected in series. Connections can be made via current collector contacts 54, or they may be made using any other method known in the art (e.g., wires connected off-chip). The ability to make use of various connectivity schemes allows for the proper scaling of the electrical load.

Figure 12:
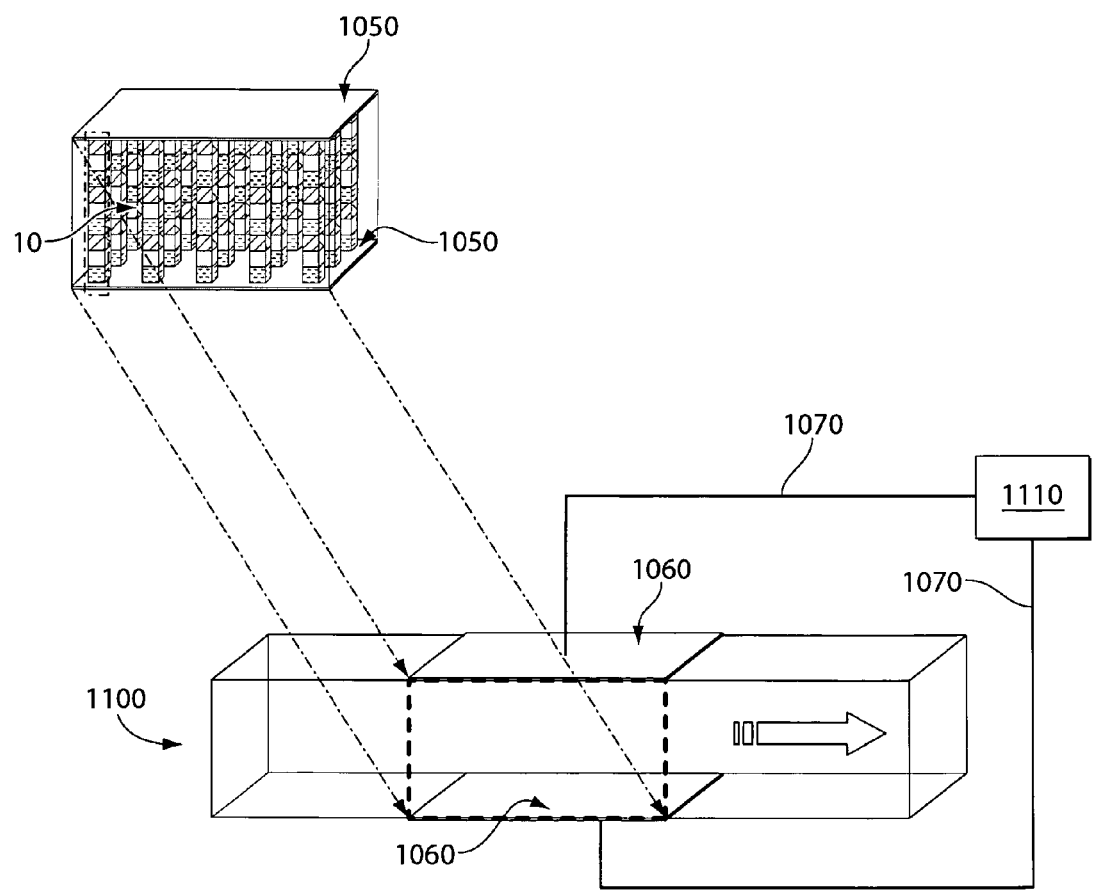
FIG. 12 is a schematic illustration showing a device connected to an external load according to yet another embodiment.

In some embodiments, electrical contacts may be formed on the outside of the walls (e.g., walls 28, 30, 32, and 34) of the fuel cell chamber. The electrical contacts formed on the outside walls could be, in some cases, in electrical contact with the electrodes within the fuel cell chamber. Placing electrical contacts on the outside of the fuel cell chamber walls may, in some cases enable easier alignment of the electrical contacts of fuel cell chamber with the electrical contacts of the devices in which it is meant to operate. Another example, shown in FIG. 12, includes device 10 comprising fuel cell contact pads 1050. Device 10 may be, in this set of embodiments, positioned inside device 1100 such that fuel cell contact pads 1050 are aligned with channel contact pads 1060. Electrical wires 1070 may be connected to channel contact pads 1060 to power external load 1110.

The electrically conductive contacts and/or walls described herein may include a wide variety of materials including, but not limited to pure metals (e.g., type 430 stainless steel, type 446 stainless steel, copper, platinum, palladium, aluminum, silver, nickel, gold, among others), alloys, doped semiconductors, polysilicon, or any other electrically conductive material.

In some embodiments, the devices described herein may be used to perform chemical reactions that require energy input. This may be achieved, in some instances, by reversing the polarity of the electrodes connected to an electrical load (e.g., a battery, AC current, etc.), relative to the descriptions given herein in regards to fuel cells, thereby resulting in power input to the device instead of power output from the device. When the devices described herein are used to input energy into a chemical reaction process, the electrodes perform the opposite functions they would perform as discussed herein when the devices are described in the context of fuel cells. For example, electrodes that are described herein as anodes for fuel cell operation would perform as cathodes in this embodiment, i.e., when performing chemical reactions that require energy input. In addition, electrodes that are described as cathodes in the context of fuel cell operation would instead perform as anodes when used for chemical reactions requiring energy input. Examples of chemical reactions that may take place include, but are not limited to, the electrolysis of water vapor to form hydrogen and oxygen gas, or the formation of oxygen and carbon monoxide from carbon dioxide. In the case of water vapor electrolysis in a chamber as described herein, for example, the water vapor is oxidized at the anode (i.e., what would be described herein as the cathode under fuel cell operation) to produce oxygen gas and hydrogen ions. Hydrogen ions produced during oxidation may be transported through the electrolyte to the cathode (i.e., what would be described herein as the anode under fuel cell operation). At the cathode of the chemical reactor, hydrogen ions and electrons form the electrical load combine to form hydrogen gas.

Figure 5:
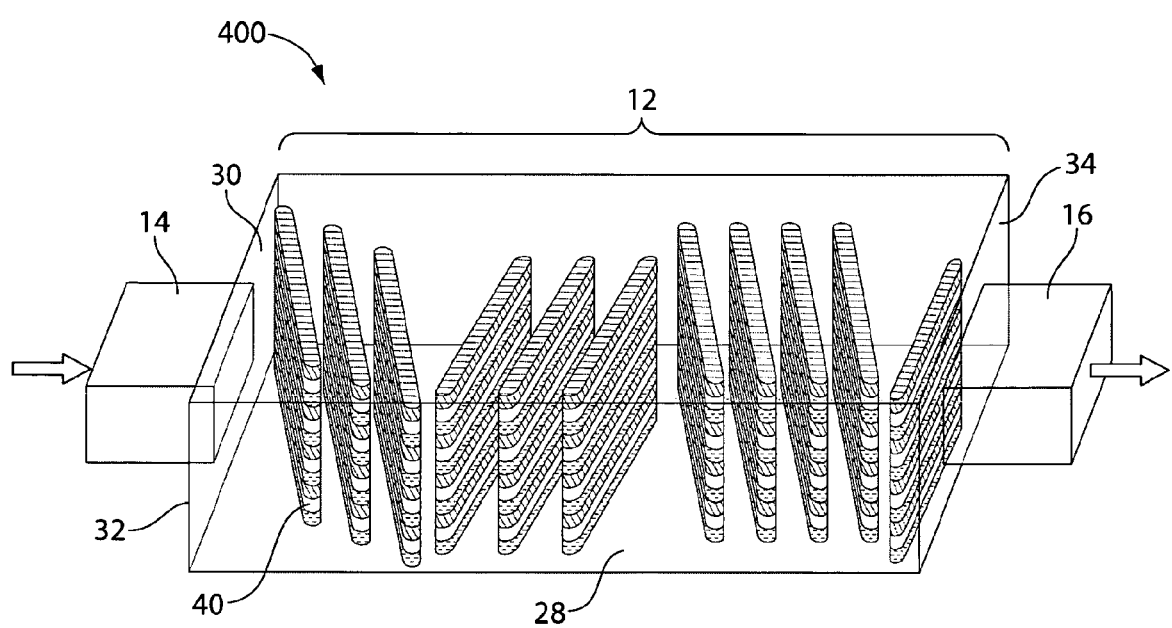
FIG. 5 is a schematic illustration of a device including fins comprising fuel cell stacks according to one embodiment.

The devices described herein may comprise stacks formed in a variety of shapes. For example, in some embodiments, the stacks may comprise fins, rows, columns, bars, rods, plates, walls, or any other three dimensional shape. The term "fin" is used to describe any structure capable of altering, checking, or breaking the force or flow of a fluid in the system. The shapes may be oriented in any manner (e.g., horizontally, vertically, diagonally, etc.) suitable for the desired application. A stack may comprise, for example, a horizontal row, a vertical column, a diagonal bar, a wall, etc. In some cases, the shapes of the stacks may improve the mixing of reactants in the fuel cell chamber and/or provide a longer flow pathway for increased residence time. FIG. 5 includes a schematic illustration of device 400 according to one set of embodiments. Device 400 includes stacks 40 arranged as fins in the shape of plates. In some embodiments, the fins may be positioned within the chamber such that the flow of gas between the inlet(s) and the outlet(s) is disrupted. In some cases, the flow of gas between the inlet(s) and the outlet(s) is disrupted by the fins such that at least some non-laminar flow occurs, while in other embodiments, laminar flow is maintained throughout the fuel cell chamber. In some embodiments, some or all of the fins in the fuel cell chamber do not comprise fuel cell units. In some of these cases, for example, the fins may comprise non-reactive materials (e.g., the materials used to construct the fuel cell chamber) such as glasses, ceramics, etc.

The devices described herein may comprise fins with a variety of aspect ratios. For example, fins may be constructed to have width to depth ratios of at least 5:1, at least 10:1, at least 25:1, or at least 50:1. Additionally, in some embodiments, the fins may have height to depth ratios of at least 5:1, at least 10:1, at least 25:1, or at least 50:1. Device 400 includes fins that span from wall 28 to wall 30 of fuel cell chamber 12. In other embodiments, the fins may span from one wall of the fuel cell chamber to any other wall of the fuel cell chamber (e.g., from wall 32 to wall 34, etc.). In addition, fins may comprise structures that are in physical contact with only one wall, two walls, or any other number of walls of the fuel cell chamber. In embodiments that includes fins, the fins may be oriented in any suitable manner. For example, in some embodiments, at least one fin may be substantially orthogonally positioned relative to the axis defined between an inlet and an outlet. In some cases, at least one fin may be substantially non-orthogonally positioned relative to the axis defined between an inlet and an outlet of the fuel cell chamber. In one set of embodiments, at least one fin within the chamber is positioned substantially parallel to the axis defined between an inlet and an outlet. Fins may, in some cases, be formed in non-rectangular shapes. For example, in some embodiments, fins may include curves, branches, grooves, or folds, among other features. In some cases, fins may include holes, posts, airfoils, and/or any other feature that serves to substantially alter aerodynamic performance.

In some embodiments, one or more of the anodes, cathodes, and/or electrolytes in the fuel cell chamber may be simultaneously exposed to at least one fuel and/or oxidant. Therefore, in some cases, the anode is used to selectively catalyze the oxidation of the fuel (e.g., hydrogen, propane, methanol, etc.). In some embodiments, the cathode is used to selectively catalyze the reduction of the oxidant (e.g., oxygen). In addition, in some cases, the electrolyte is used to selectively transport one or more ion species (e.g., oxygen ions in the case of SOFCs). Selective catalysis at the anode and cathode may be desirable properties, for example, in the case where the fuel cell is operating as a single chamber fuel cell, as is known in the art.

The anode(s), cathode(s), and electrolyte(s) described herein may comprise a perovskite structure, transition metals, noble metals and fluorite structure such as those that are used in current SOFC devices, for example. In some cases, rigid-structured fuel cells that may be created via microfabrication techniques used for ICs may be employed. For example, the anode(s), cathode(s), electrolyte(s), and/or contact(s) may be formed through chemical and physical techniques including thin-film techniques such as spin-on methods, chemical vapor deposition, pulsed laser deposition, vacuum plasma spray, wet spray, sputtering, evaporation, molecular beam epitaxy, or any method known to those of ordinary skill in the art. Alternative materials that may be used include solid acid materials or composite materials that provide structural flexibility while retaining the necessary selective catalytic and/or ionic/electronic properties required for fuel cell operation. For example, solid acids such as $CsHSO_4$ have been shown to have high proton conductivities making these suitable for fuel cell electrolytes. Solid acid or composite electrolyte/electrode materials may provide mechanical characteristics that allow for more free-form design and construction of the fuel cell, allowing the fuel cell package to assume a wide variety of forms and configurations.

The electrolyte(s) may be formed from any suitable material. In some embodiments, the electrolyte(s) are at least one of oxygen ion conducting membranes, proton conductors, carbonate ($CO_3^{-2}$) conductors, $OH^-$ conductors, and/or mixtures thereof. In some cases, the electrolyte(s) are at least one of cubic fluorite structures, doped cubic fluorites, proton-exchange polymers, proton-exchange ceramics, and mixtures thereof. Further, oxygen-ion conducting oxides that may be used as the electrolyte(s) include doped ceria compounds such as gadolinium-doped ceria ($Gd_{1-x}Ce_xO_{2-d}$) or samarium-doped ceria ($Sm_{1-x}Ce_xO_{2-d}$), doped zirconia compounds such as yttrium-doped zirconia ($Y_{1-x}Zr_xO_{2-d}$) or scandium-doped zirconia ($Sc_{1-x}Zr_xO_{2-d}$), perovskite materials such as $La_{1-x}Sr_xGa_{1-y}Mg_yO_{3-d}$, yttria-stabilized bismuth oxide, and/or mixtures thereof. Examples of proton conducting oxides that may be used as electrolyte(s) include, but are not limited to, undoped and yttrium-doped $BaZrO_{3-d}$, $BaCeO_{3-d}$, and $SrCeO_{3-d}$ as well as $La_{1-x}Sr_xNbO_{3-d}$.

The anode(s) and cathode(s) may be formed from any suitable material, as desired and/or necessitated by a particular end use. In some cases, each of the anode(s) and/or cathode(s) comprises at least one of metals, ceramics, and cermets. Non-limiting examples of metals which may be suitable for the anode(s) include at least one of Ni, Mn, Pt, Fe, Cr, and/or mixtures thereof among others. Non-limiting examples of ceramics which may be suitable for the anode(s) include at least one of $Ce_xSm_yO_{2-d}$, $Ce_xGd_yO_{2-d}$, $La_xSr_y$-$Cr_zO_{3-d}$, and/or mixtures thereof. Non-limiting examples of cermets which may be suitable for the anode(s) include at least one of Ni—YSZ, Cu—YSZ, Ni—SDC, Ni-GDC, Cu—SDC, Cu-GDC, and/or mixtures thereof. For example, the anode(s) may comprise cermet composites such as Ni—$Y_{1-x}Zr_xO_{2-d}$ or Ni—$Gd_{1-x}Ce_xO_{2-d}$. The anode(s) may also comprise, for example, all-ceramic materials such as $La_{1-x}Sr_x(TM)O_{3-d}$ where TM is Cr, Ti, Mn, Fe, Ni and/or mixtures of these. In addition, the anode may comprise materials such as $La_4Sr_8Ti_{12}O_{38-d}$, $CeO_{2-d}$, of any other suitable material.

Non-limiting examples of metals which may be suitable for the cathode(s) include at least one of Ag, Pt, Cr, Mn, Fe, Co, Ni, and/or mixtures thereof among others. Non-limiting examples of ceramics which may be suitable for the cathode(s) include at least one of $Sm_xSr_yCoO_{3-d}$, $Ba_xLa_y$-$CoO_{3-d}$, $Gd_xSr_yCoO_{3-d}$, and/or mixtures thereof. As examples, the cathodes used in the various embodiments described herein may comprise, in some cases, Sr-doped lanthanum manganite perovskite cathodes such as, for example, $La_{1-x}Sr_x(TM)O_{3-d}$ where TM=Cr, Mn, Fe, Co, Ni, or mixtures of these. In some embodiments, the cathode(s) may comprise Sr-doped perovskite cathodes with two TM elements at the b-site such as, for example, $La_{1-x}Sr_x(Co_{1-y}Fe_y)O_{3-d}$ or $Ba_{1-x}Sr_x(Co_{1-y}Fe_y)O_{3-d}$. The cathode(s) may comprise, in some cases, Sr-doped samarium cobaltites such as, for example, $Sm_{1-x}Sr_xCoO_{3-d}$.

In some embodiments, at least one of the anodes, cathodes, or electrolytes in the fuel cell chamber is dense such that the diffusion of gas through the component is essentially zero. However, in some cases, at least one of the anodes, cathodes, or electrolytes in the fuel cell chamber is porous. In some cases, the anodes, cathodes, and electrolytes of all of the fuel cell units are porous. The use of porous components (e.g., anodes, cathodes, electrolytes, fins, etc.) may, in some instances, increase the available surface area of catalyst in the system. In addition, the use of porous components may promote mixing of the fuel and oxidant species within the fuel cell chamber. In addition, the use of porous components may lead to other desirable fluid flow properties.

As used herein, "porous" means containing a plurality of openings; this definition includes both regular and irregular openings, as well as openings that generally extend all the way through a structure as well as those that do not (e.g., interconnected, or "open" pores, as opposed to at least partially non-connected, or "closed" pores). Thus, an interconnected porous structure is one where a significant fraction of the pores extends all the way through the structure. The porous material may have any suitable porosity. For example, the porous material may have a porosity of at least about 1%, at least about 10%, at least about 25%, at least about 40%, at least about 50%, at least about 60%, at least about 70%, at least about 75%, or at least about 80% (where the percentages indicate void volume within the material), or the porous material may have an average pore size of less than about 300 micrometers, for example, less than about 100 micrometers, between about 1 micrometer, less than about 500 nanometers and about 300 micrometers, between about 50 nanometers and about 200 micrometers, between about 500 nanometers and about 100 micrometers, or between about 1 micron and about 50 microns.

The average pore size may be determined, for example, from density measurements, from optical and/or electron microscopy images, or from porosimetry, e.g., by the intrusion of a non-wetting liquid (often mercury) at high pressure into the material, and is usually taken as the number average size of the pores present in the material. Such techniques for determining porosity of a sample are known to those of ordinary skill in the art. For example, porosimetry measurements can be used to determine the average pore size based on the pressure needed to force liquid into the pores of the sample. In one embodiment, the porous material is substantially permeable to gaseous molecules (e.g., air or oxygen, gaseous fuels, etc.) and/or liquids (e.g., water, liquid fuels, liquid hydrocarbons, etc.); for example, the substantially permeable porous material may have a permissivity to air of at least about 0.1 $cm^3$/min cm/psi (under standard conditions, i.e., standard temperature or pressure), at least about 0.3 $cm^3$/min cm/psi, at least about 1 $cm^3$/min cm/psi, at least about 5 $cm^3$/min cm/psi, or at least about 1000 $cm^3$/min cm/psi. One method of determining permissivity is to measure a flow rate (e.g., in $cm^3$/min) of a flowing media such as air or oxygen passing through a sample having a known thickness (cm) and cross sectional area ($cm^2$) under a given pressure (psi, 1 psi=6.89475 kPa).

In some embodiments, the device may include one or more fuel processing regions. The fuel processing region may be used, in some cases, to remove at least a portion of the impurities present in the inlet streams. The fuel processing region may also be used, in some cases, to perform at least one chemical reaction on at least a portion of the inlet fuel species prior to an interaction between the fuel species and the fuel cell units. For example, a fuel processing region may be incorporated to convert longer-chain hydrocarbons (e.g., octane, decane, etc.) into shorter-chain hydrocarbons such as methane and propane. As another example, the fuel processing region may be used to convert hydrocarbons, alcohols, ammonia or other fuels to hydrogen. In one set of embodiments, the fuel processing region may comprise a separate chamber positioned upstream of the inlet to the fuel cell chamber.

Figure 6:
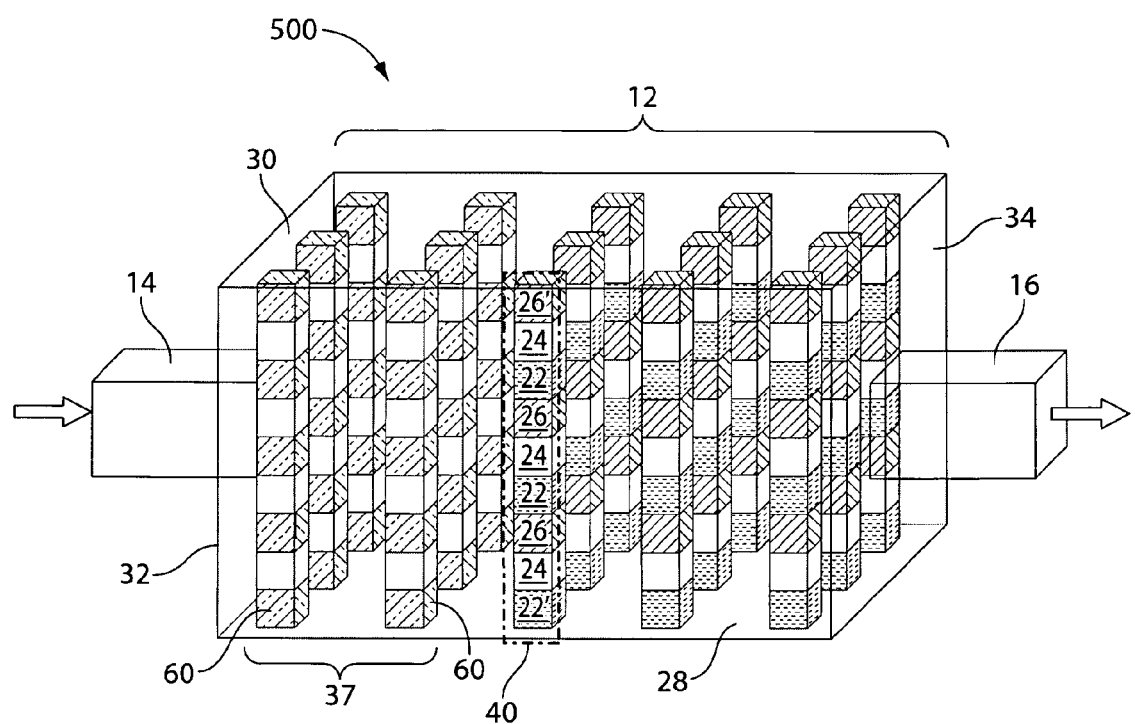
FIG. 6 is a schematic illustration of a device comprising a fuel processing region according to one embodiment.

In some cases, the fuel processing region may comprise all or part of the inlet channel. In another set of embodiments, the fuel processing region comprises a section of the fuel cell chamber, as shown as region 37 in FIG. 6. The fuel processing region can assume a variety of configurations. For instance, the fuel processing region in FIG. 6 may comprise posts of suspended catalyst. The posts may be porous, in some cases. Porous posts may serve to increase the exposed active surface area of reforming catalyst and/or to produce desirable fluid dynamic effects (e.g., increased mixing, etc.). In some embodiments, fuel processing posts may be replaced or used in coordination with other structures configured to support reforming catalyst such as, for example, fins, porous three-dimensional scaffolds, coated chamber walls, among others. Fuel processing catalyst and structures may also be interspersed among fuel cell units and stacks. In some cases, interspersing fuel processing catalyst among fuel cell units and stacks may, for example, lead to a more uniform reaction rate of fuel throughout the fuel cell chamber.

Figure 8:
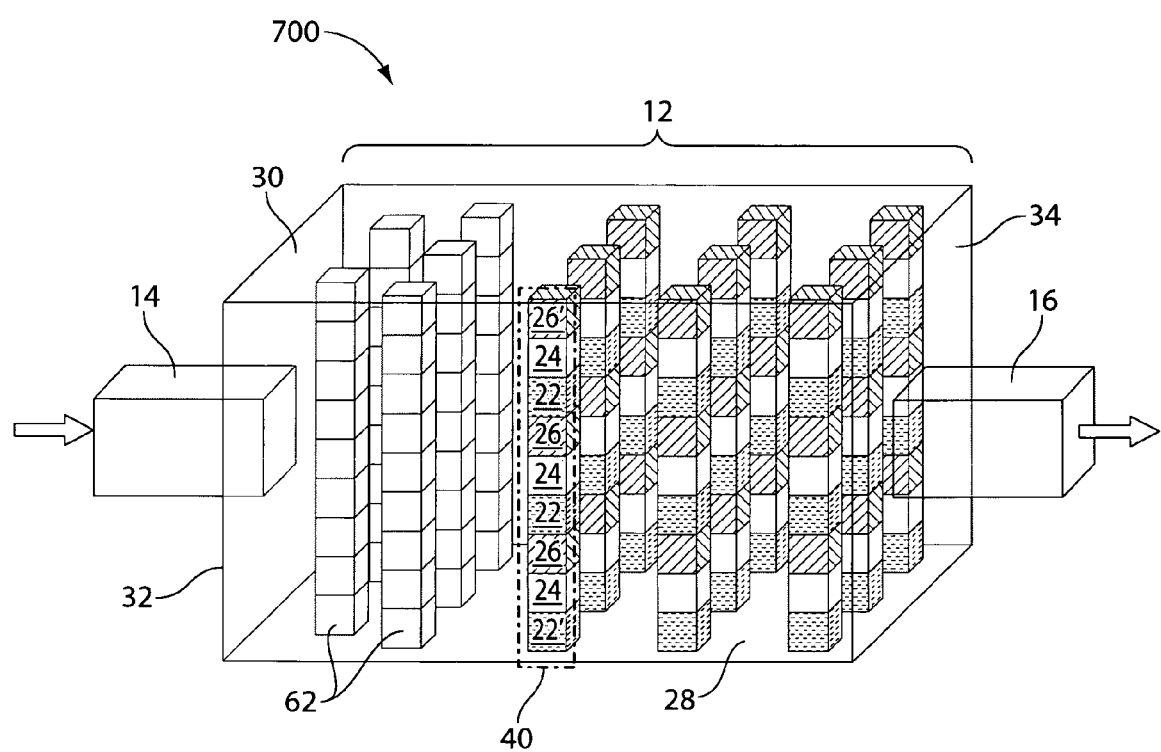
FIG. 8 is a schematic illustration of a device comprising a mixing region according to one embodiment.

In some embodiments, the device may include one or more mixing regions. In cases where the fuel cell chamber comprises both mixing and fuel processing regions, the mixing region(s) may be upstream of, downstream of, or integrated with the fuel processing region(s). In some cases, the fuel and oxidant may be mixed in the mixing region(s) prior to reaching the fuel processing and/or fuel cell stack regions. In one set of embodiments, the mixing region may comprise a separate chamber positioned upstream of the inlet to the fuel cell chamber. In some embodiments, the mixing region(s) may comprise all or part of the inlet channel. For instance, in another set of embodiments, the mixing region comprises a section of the fuel cell chamber, as shown in device 700 of FIG. 8. The mixing region(s) may comprise a variety of features to enhance mixing between components of the inlet(s). For example, the mixing region(s) may comprise posts 62, as shown in FIG. 8. In some embodiments, the mixing region(s) may comprise stacks or fins. Fins may be cuboid in shape, or the fins may include curves, branches, grooves, or folds, among others features. In some cases, the mixing region (or the features therein) may be porous or may include posts, airfoils, and/or any other feature that serves to substantially alter the fluid dynamics of fluid flow within the chamber.

Figure 7:
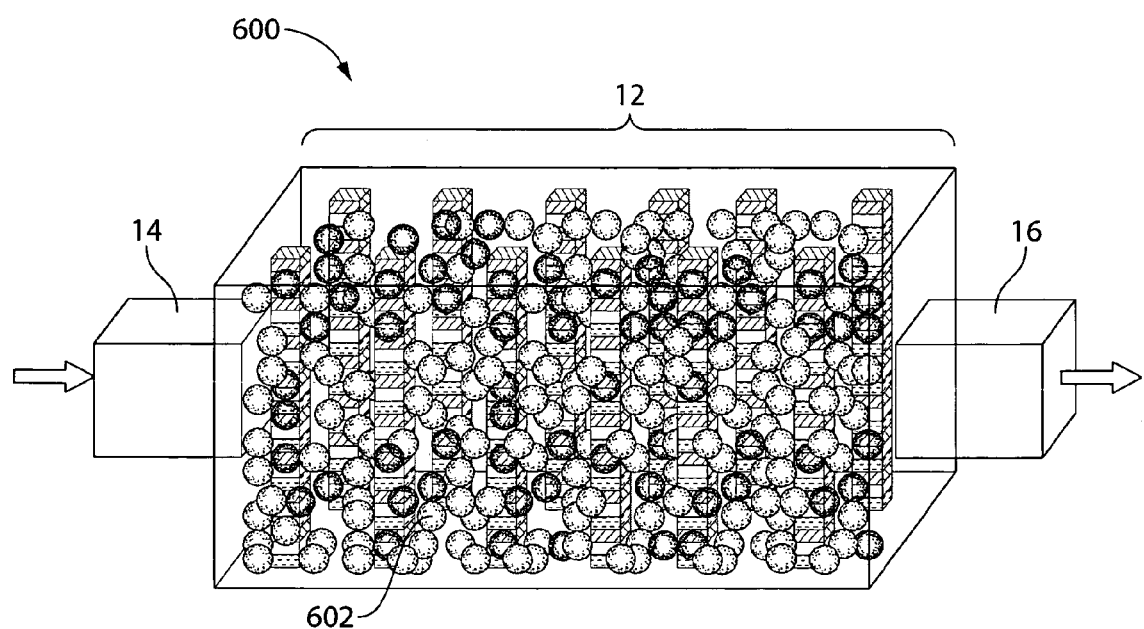
FIG. 7 is a schematic illustration of a device comprising pre-loaded fuel source according to one embodiment.

The devices described herein may, in some cases, may comprise a pre-loaded fuel source in the fuel cell chamber capable of reacting in the device upon flowing an oxidant through the inlet. The pre-loaded fuel source may be in the form of, in some instances, solid fuel particles, a porous scaffold of solid fuel, or any other suitable configuration. FIG. 7 illustrates an embodiment in which device 600 comprises solid fuel particles 602 as the pre-loaded fuel source. The pre-loaded fuel source may be porous in some cases. In addition, the pre-loaded fuel source may comprise any suitable shape including, but not limited to, spheres, cylinders, and cuboids, among others. The pre-loaded fuel source may also be formed of any suitable chemical composition including, for example, coal, porous scaffolds saturated with liquid hydrocarbons, etc. In some embodiments, the pre-loaded fuel source may be configured to release fuel at a controlled rate.

Another aspect of the invention is related to methods for forming fuel cell devices described herein. The anode(s), cathode(s), electrolyte(s), and/or electrode(s) may be fabricated using a variety of methods. In some embodiments, the anode(s), cathode(s), electrolyte(s), and/or electrode(s) may be deposited as substantially planar, thin films. A planar thin film may be of any shape and can be, for example, rectangular, or circular, or can be shaped to conform to an irregularly shaped substrate. The anode(s), cathode(s), electrolyte(s), and/or electrode(s) may be deposited in any geometrical form that is suitable for a particular device application. In some embodiments, one or more anode, cathode, and/or electrolyte may have an average thickness less than about 10 mm, less than about 1 mm, less than about 100 microns, less than about 10 microns, less than about 1 micron, less than about 500 nm, less than about 100 nm, less than about 30 nm, or less than about 10 nm. In some cases, one or more anode, cathode, electrolyte, and/or electrode may be of consistent thickness, and in some cases the thickness will vary less than 50%, less than 25% or less than 10%.

The fuel cell chamber, inlet(s), and/or outlet(s) may also be fabricated using a variety of methods. For example, the fuel cell chamber, inlet(s), and/or outlet(s) may be formed by etching a channel into surfaces of materials in a variety of ways in accordance with the invention, including molding of the material so as to include the trench, formation of the material followed by ablation, selective chemical etching or other removal of material to form the trench, or the like. Those of ordinary skill in the art are capable of forming such channels in a variety of ways. Channels of the invention can be of a variety of dimensions. In one embodiment, a trench of the invention is formed in a material at a depth of at least about 5% of the thickness of the material, and in other embodiments can be formed at a depth of at least about 10%, 20%, 25%, 30%, or 35% of the thickness of the material.

In some cases, the channels formed by some methods must be covered so as to enclose the channel. This can be accomplished by any of a variety of methods known in the art. For example, in some embodiments (e.g., in the case of microfabricated channels), the method of covering the channels may comprise wafer bonding (e.g., fusion bonding of two silicon wafers, anodic bonding of a silicon wafer and a borosilicate wafer, etc.). In some embodiments, the method of covering the channels may comprise gluing a capping layer onto the channel (e.g., via high-temperature solder, glass frits, etc.).

In one set of embodiments, the fuel cell chamber, inlet(s), and/or outlet(s) may be formed using micromachining techniques (e.g., drilling, welding, etc.). In some embodiments, the components of the fuel cell system may be fabricated via traditional machining methods (e.g., drilling, welding, etching, etc. of macroscale materials).

A "channel," as used herein, means a feature on or in an article (substrate) that at least partially directs the flow of a fluid. The channel can have any cross-sectional shape (circular, oval, triangular, irregular, square or rectangular, or the like) and can be covered or uncovered. In embodiments where it is completely covered, at least one portion of the channel can have a cross-section that is completely enclosed, or the entire channel may be completely enclosed along its entire length with the exception of its inlet(s) and outlet(s). A channel may also have an aspect ratio (length to average cross sectional dimension) of at least 2:1, more typically at least 3:1, 5:1, or 10:1 or more. An open channel generally will include characteristics that facilitate control over fluid transport, e.g., structural characteristics and/or physical or chemical characteristics, or other characteristics that can exert a force (e.g., a containing force) on a fluid. The fluid within the channel may partially or completely fill the channel.

The channel may be of any size, for example, having a largest dimension perpendicular to fluid flow of less than about 5 mm or 2 mm, or less than about 1 mm, or less than about 500 microns, less than about 200 microns, less than about 100 microns, less than about 60 microns, less than about 50 microns, less than about 40 microns, less than about 30 microns, less than about 25 microns, less than about 10 microns, less than about 3 microns, less than about 1 micron, less than about 300 nm, less than about 100 nm, less than about 30 nm, or less than about 10 nm. In some cases the dimensions of the channel may be chosen such that fluid is able to freely flow through the article or substrate. The dimensions of the channel may also be chosen, for example, to allow a certain volumetric or linear flowrate of fluid in the channel. Of course, the number of channels and the shape of the channels can be varied by any method known to those of ordinary skill in the art. In some cases, more than one channel may be used.

In some, but not all embodiments, all components of the systems and methods described herein are microfluidic. "Microfluidic," as used herein, refers to a device, apparatus or system including at least one fluid channel having a cross-sectional dimension of less than 1 mm. A "microfluidic channel," as used herein, is a channel meeting these criteria.

The fuel cell chamber may comprise any material capable of supporting an electrolyte, an anode, a cathode, or combinations thereof. The substrate material has, in certain embodiments, a thermal coefficient of expansion similar to those of the other components of the fuel cell to promote adhesion and prevent separation of the layers at various temperatures. In some instances, materials with dissimilar thermal expansion coefficients may expand and contract at different rates and amounts with changes in temperature, which can cause stress and delamination of the layers. Examples of appropriate substrate materials may include, but are not limited to, stainless steel with or without an oxide layer, titanium, or oxides of titanium or aluminum. The substrate may comprise, for example, a semiconductor wafer or a membrane, such as a thinned membrane. In one embodiment, the substrate can consist essentially entirely of, or include, a sacrificial layer. In other embodiments, the substrate may be a non-sacrificial layer. The substrate can be prepared, for example, by one of a number of micromachining methods known to those skilled in the art. Examples of such methods include, but are not limited to, photofabrication, etching, electrodischarge machining, electrochemical machining, laser beam machining, wire electrical discharge grinding, focused ion beam machining, micromilling, micro-ultrasonic machining, and micropunching. The dimensions of the substrate may be any length, width, and thickness that is desired for a particular end use and may be rectangular, circular or otherwise shaped. In some embodiments, the substrate surface has an area of less than 1000 $cm^2$, less than 100 $cm^2$, less than 10.0 $cm^2$, less than 1.0 $cm^2$, less than 0.1 $cm^2$, or less than 0.01 $cm^2$.

Figure 9A:
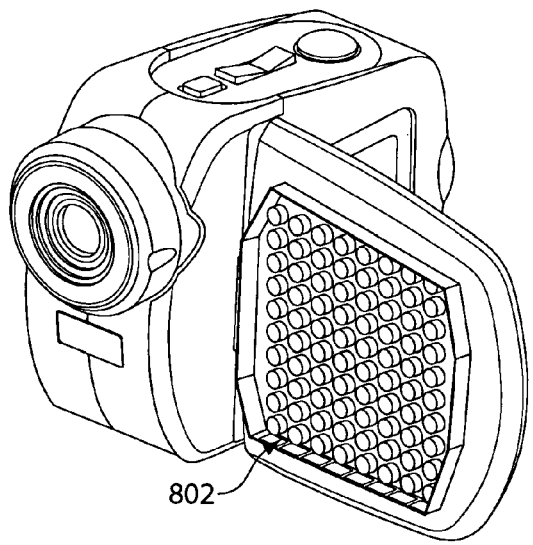
FIGS. 9A-D include schematic illustrations of devices integrated with portable electronic equipment according to one embodiment.
Figure 9B:
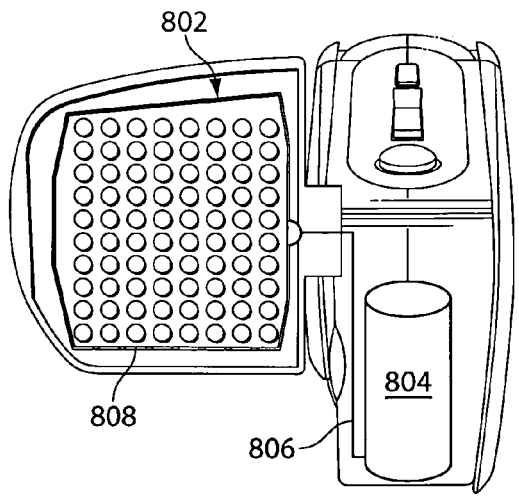
Figure 9C:
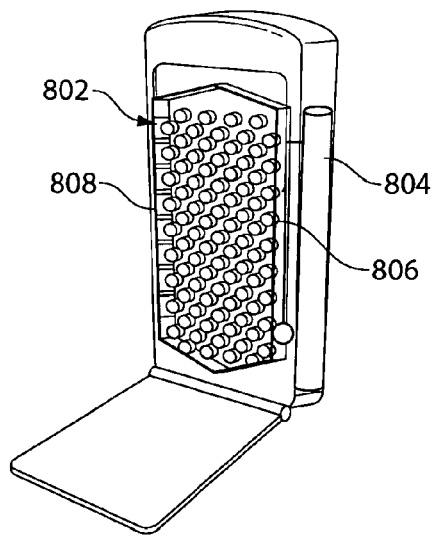
Figure 9D:
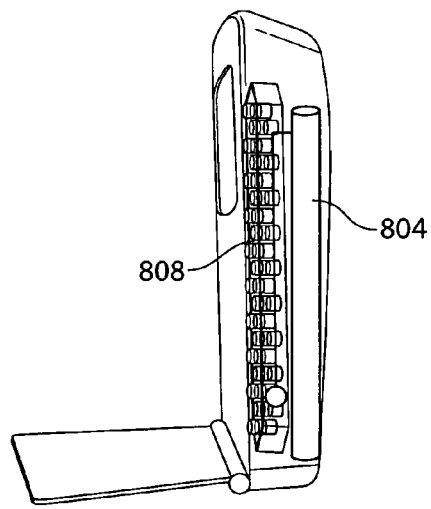

The devices described herein may be used in a variety of electronic devices, including portable electronics devices. For example, the fuel cell devices may be integrated with laptops, cellular phones, cameras, camcorders, media players, or any other electronics device. As a non-limiting example, FIGS. 9A-9B include a schematic illustration of a fuel cell chamber 802 integrated with a camcorder. The system includes a replaceable fuel cartridge 804 and a fuel line 806 in fluidic communication with the fuel cartridge and the fuel cell chamber. In addition, the system includes air inlet 808. FIGS. 9C-9D include a schematic illustration of a fuel cell chamber 802 integrated with a cellular phone, as another non-limiting example. This system also includes a replaceable fuel cartridge 804, a fuel line 806 in fluidic communication with the fuel cartridge and the fuel cell chamber, and an air inlet 808. In both example systems, the fuel cell chamber is sufficiently thin that ordinary use of the devices would not be impeded. Moreover, the flexibility in sizing the device and scaling the power output allows for easy adaptability to a variety of surface shapes. In these and other examples, the use of a fuel cell cartridge would allow for quick and convenient refueling of the fuel cell device in certain cases.

U.S. Provisional Patent Application Ser. No. 60/931,803, filed May 25, 2007, entitled "Three Dimension Single Chamber Fuel Cell," by la O', et al. is incorporated herein by reference.

While several embodiments of the present invention have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present invention. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present invention is/are used. Those skilled in the art will recognize, or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present invention is directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present invention.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Other elements may optionally be present other than the elements specifically identified by the "and/or" clause, whether related or unrelated to those elements specifically identified unless clearly indicated to the contrary. Thus, as a non-limiting example, a reference to "A and/or B," when used in conjunction with open-ended language such as "comprising" can refer, in one embodiment, to A without B (optionally including elements other than B); in another embodiment, to B without A (optionally including elements other than A); in yet another embodiment, to both A and B (optionally including other elements); etc.

As used herein in the specification and in the claims, "or" should be understood to have the same meaning as "and/or" as defined above. For example, when separating items in a list, "or" or "and/or" shall be interpreted as being inclusive, i.e., the inclusion of at least one, but also including more than one, of a number or list of elements, and, optionally, additional unlisted items. Only terms clearly indicated to the contrary, such as "only one of" or "exactly one of," or, when used in the claims, "consisting of," will refer to the inclusion of exactly one element of a number or list of elements. In general, the term "or" as used herein shall only be interpreted as indicating exclusive alternatives (i.e. "one or the other but not both") when preceded by terms of exclusivity, such as "either," "one of," "only one of," or "exactly one of." "Consisting essentially of," when used in the claims, shall have its ordinary meaning as used in the field of patent law.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

What is claimed is:

1. A fuel cell device, comprising:
   a fuel cell chamber comprising at least one inlet and at least one outlet;
   a first stack at least partially within the chamber, the first stack comprising at least a first fuel cell unit and a second fuel cell unit, the first and second fuel cell units each comprising an anode, a cathode, and an electrolyte disposed between the anode and the cathode, wherein the anode of the first fuel cell unit is in physical contact with the cathode of the second fuel cell unit; and
   a second stack at least partially within the chamber, wherein the second stack is separated from the first stack such that at least a portion of a fluid transported between the inlet and the outlet can be transported between the first stack and the second stack.

2. The fuel cell device of claim 1, wherein the chamber inlet is fluidically connectable to a source of a fuel for the device.

3. The fuel cell device of claim 2, wherein the chamber inlet is simultaneously fluidically connectable to a source of an oxidant for the device.

4. The fuel cell device of claim 3, wherein the anodes, cathodes, and electrolytes of the first fuel cell unit and the second fuel cell unit within the fuel cell chamber are simultaneously exposed to at least one oxidant.

5. The fuel cell device of claim 1, wherein the first stack is in physical contact with two opposing walls of the fuel cell chamber.

6. The fuel cell device of claim 1, wherein the anodes, cathodes, and electrolytes of the first and second fuel cell units in the fuel cell chamber are constructed and arranged to be simultaneously exposed to at least one fuel.

7. The fuel cell device of claim 1, wherein the fuel cell chamber further comprises an anode current collector and a cathode collector, wherein at least one anode is not in physical contact with the anode current collector.

8. The fuel cell device of claim 1, wherein the fuel cell chamber further comprises an anode current collector and a cathode collector, wherein at least one anode is in electrical communication with the anode current collector via an electrical route that passes through at least one cathode.

9. The fuel cell device of claim 1, wherein the first stack is positioned within the chamber such that the flow of a fluid between the inlet and the outlet is disrupted by the first stack such that at least some non-laminar flow occurs.

10. The fuel cell device of claim 9, wherein at least one dimension of the chamber that is perpendicular to a longest vector defined between an inlet and an outlet has a maximum length of no more than about 1 mm.

11. The fuel cell device of claim 9, wherein the first stack is substantially orthogonally positioned within the chamber relative to the axis defined between the inlet and the outlet.

12. The fuel cell device of claim 9, wherein the first stack is substantially non-orthogonally positioned within the chamber relative to the axis defined between the inlet and the outlet.

13. The fuel cell device of claim 12, wherein the first stack is positioned within the chamber substantially parallel to the axis defined between the inlet and the outlet.

14. The fuel cell device of claim 1, wherein at least one of the anodes, cathodes, and electrolytes is porous.

15. The fuel cell device of claim 1, wherein the anodes, cathodes, and electrolytes of the first fuel cell unit and the second fuel cell unit within the fuel cell chamber are porous.

16. The fuel cell device of claim 1, further comprising a fuel processing region constructed and arranged to perform at least one chemical reaction on at least a portion of an inlet fuel species prior to an interaction between the fuel species and the fuel cell units.

17. The fuel cell device of claim 1, wherein the fuel cell chamber comprises multiple inlets, each inlet fluidically connectable to a stream of mixed fuel and oxidant.

18. The fuel cell device of claim 1, wherein the fuel cell chamber comprises multiple inlets, wherein a first set of inlets is fluidically connectable to at least one source of fuel and a second set of inlets is fluidically connectable to at least one source of oxidant.

19. The fuel cell device of claim 1, wherein the fuel cell chamber further comprises a mixing region constructed and arranged to mix the fuel and oxidant.

20. The fuel cell device of claim 19, wherein the fuel cell chamber further comprises a fuel processing region constructed and arranged to perform at least one chemical reaction on at least a portion of an inlet fuel species prior to an interaction between the fuel species and the fuel cell units.

21. The fuel cell device of claim 1, further comprising a pre-loaded fuel source in the fuel cell chamber capable of reacting in the device upon flowing an oxidant through the inlet.

22. The fuel cell device of claim 21, wherein the pre-loaded fuel source comprises solid fuel particles.

23. The fuel cell device of claim 22, wherein the solid fuel particles comprise coal particles.

24. The fuel cell device of claim 21, wherein the pre-loaded fuel source comprises a porous scaffold of solid fuel.

25. The fuel cell device of claim 21, wherein the pre-loaded fuel source comprises a porous scaffold saturated with liquid hydrocarbons.

26. The fuel cell device of claim 21, wherein the pre-loaded fuel source is configured to release fuel at a controlled rate.

27. The fuel cell device of claim 5, wherein the second stack is in physical contact with the two opposing walls of the fuel cell chamber.

28. A fuel cell device, comprising:
   a fuel cell chamber comprising at least one inlet and at least one outlet; and
   a stack comprising at least a first fuel cell unit and a second fuel cell unit, the first and second fuel cell units each comprising an anode, a cathode, and an electrolyte disposed between the anode and the cathode, wherein:

the anode of the first fuel cell unit is in physical contact with the cathode of the second fuel cell unit, the anode and cathode of each fuel cell units are each at least partially within the chamber, and the stack is configured such that at least a portion of a fluid transported between the inlet and the outlet is transported around the stack.

29. The fuel cell device of claim 28, wherein the stack is in physical contact with two opposing walls of the fuel cell chamber.

30. The fuel cell device of claim 28, wherein the chamber inlet is fluidically connectable to a source of a fuel for the device.

31. The fuel cell device of claim 30, wherein the chamber inlet is simultaneously fluidically connectable to a source of an oxidant for the device.

32. The fuel cell device of claim 28, wherein the anodes, cathodes, and electrolytes of the fuel cell units in the fuel cell chamber are constructed and arranged to be simultaneously exposed to at least one fuel.

33. The fuel cell device of claim 28, wherein the fuel cell chamber further comprises an anode current collector and a cathode collector, wherein at least one anode is not in physical contact with the anode current collector.

34. The fuel cell device of claim 28, wherein the fuel cell chamber further comprises an anode current collector and a cathode collector, wherein at least one anode is in electrical communication with the anode current collector via an electrical route that passes through at least one cathode.

35. The fuel cell device of claim 1, wherein the stack is positioned within the chamber such that the flow of a fluid between the inlet and the outlet is disrupted by the stack such that at least some non-laminar flow occurs.

36. The fuel cell device of claim 28, wherein at least one dimension of the chamber that is perpendicular to a longest vector defined between an inlet and an outlet has a maximum length of no more than about 1 mm.

37. The fuel cell device of claim 36, wherein the stack is substantially orthogonally positioned within the chamber relative to the axis defined between the inlet and the outlet.

38. The fuel cell device of claim 28, wherein at least one of the anodes, cathodes, and electrolytes is porous.

39. The fuel cell device of claim 28, wherein the anodes, cathodes, and electrolytes of the first fuel cell unit and the second fuel cell unit within the fuel cell chamber are porous.

* * * * *